United States Patent
Spyker et al.

(10) Patent No.: US 6,922,782 B1
(45) Date of Patent: Jul. 26, 2005

(54) APPARATUS AND METHOD FOR ENSURING DATA INTEGRITY OF UNAUTHENTICATED CODE

(75) Inventors: Andrew W. Spyker, Raleigh, NC (US); Byron Allen Williams, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 803 days.

(21) Appl. No.: 09/595,287

(22) Filed: Jun. 15, 2000

(51) Int. Cl.⁷ .............................. H04L 9/00; H04L 9/32; G06F 11/30; G06F 12/14
(52) U.S. Cl. ....................... 713/200; 713/161; 713/170; 713/173; 713/181; 713/187
(58) Field of Search ................................. 713/188, 194, 713/200–202; 717/148, 126

(56) References Cited

U.S. PATENT DOCUMENTS

| | | | | |
|---|---|---|---|---|
| 5,692,047 A | * | 11/1997 | McManis | 713/167 |
| 6,075,940 A | * | 6/2000 | Gosling | 717/126 |
| 6,092,147 A | * | 7/2000 | Levy et al. | 711/6 |
| 6,480,831 B1 | * | 11/2002 | Cordery et al. | 705/60 |
| 6,505,300 B2 | * | 1/2003 | Chan et al. | 713/164 |

* cited by examiner

*Primary Examiner*—Andrew Caldwell
*Assistant Examiner*—Jeffery Williams, Jr.
(74) *Attorney, Agent, or Firm*—Duke W. Yee; Jerry W. Herndon; Gerald H. Glanzman

(57) ABSTRACT

An apparatus and method for ensuring data integrity of unauthenticated code is provided. With the apparatus and method, a hash value of unauthenticated code is embedded in associated automatically authenticated code. When the automatically authenticated code is downloaded and executed, the automatically authenticated code may require that the unauthenticated code also be downloaded for proper execution of the automatically authenticated code on a particular client device. The unauthenticated code can be downloaded and its integrity verified by generating a hash value of the unauthenticated code and comparing the generated hash value to a hash value embedded in the automatically authenticated code. If there is a match, the unauthenticated code is verified. If there is not a match, the unauthenticated code has been corrupted during transmission and is not verified. As a result, the unauthenticated code is not used by the client device. The download of the unauthenticated code can then be attempted again and the verification process repeated.

29 Claims, 6 Drawing Sheets

APPARATUS AND METHOD FOR ENSURING DATA INTEGRITY OF UNAUTHENTICATED CODE

BACKGROUND OF THE INVENTION

1. Technical Field

The present invention is directed to an apparatus and method for ensuring data integrity of unauthenticated code. In particular, the present invention is directed to an apparatus and method for authenticating unauthenticated code based on hash value information obtained in automatically authenticated code.

2. Description of Related Art

The use of platform independent code, such as JAVA, has increased with increase usage of the Internet. "JAVA" is a trademark of Sun Microsystems, Inc. This is because the Internet provides information, services, and computer programs to millions of client devices which may be configured in any number of different ways. Because it is rather impractical to require all client devices to adhere to a particular configuration, platform independent code provides a solution for allowing computer programs to execute properly on virtually all client devices, independent of the particular configuration of the client device.

JAVA is a programming language from Sun that is designed for Internet (World Wide Web) and intranet applications. JAVA programs can be called from within HTML documents or launched stand alone. JAVA is an interpreted language that uses an intermediate language. The source code of a JAVA program is compiled into "byte code," which cannot be run by itself. The byte code must be converted into machine code at runtime.

Upon finding a JAVA applet, the Web browser on the client device switches to its JAVA interpreter, i.e. the JAVA Virtual Machine (JVM), which translates the byte code into machine code and runs it. This means JAVA programs are not dependent on any specific hardware and will run in any computer with the JAVA Virtual Machine.

While the JAVA code is platform independent, often JAVA applets will need native code, such as dynamically linked library files (.dll files), in order for the JAVA code to be executed correctly on a particular client device. These native code files are typically downloaded when the executed JAVA code indicates that a native code file is required.

JAVA applets and applications are routinely downloaded from servers to client devices over the Internet. During transmission of these JAVA applets and applications, it is possible that random corruption may occur such that the JAVA code that is received at the client device is not the same as the JAVA code sent by the server. More troublesome is the possibility of interception by a third party who may purposefully corrupt the JAVA code, e.g., by inserting a virus or the like.

Presently, known JAVA Application Program Interfaces (API) allow for some ability to check data integrity of JAVA code through the generation of digital signatures, e.g. through a one-way hash function or the like. However, currently, there is no API which allows for authentication of native code that is needed by the JAVA code. In other words, while the JAVA code may be authenticated as having not been corrupted during transmission from a server to the client device, the native code cannot be authenticated in this way.

One solution to this problem is to build a signature and certificate mechanism into the code that downloads the native code. While this solution is possible, it requires a large amount of overhead. Another solution is to not check the data integrity of the native code. This solution is not acceptable because it provides an avenue through which the security of the client devices may be compromised.

Thus, it would be beneficial to have an apparatus and method by which the data integrity of both the automatically authenticated code, e.g., the platform independent code, and the unauthenticated code, e.g., the native code, can be authenticated.

SUMMARY OF THE INVENTION

The present invention provides an apparatus and method for ensuring data integrity of unauthenticated code. In particular, the present invention is directed to an apparatus and method for authenticating native code based on hash value information obtained in automatically authenticated code, e.g., platform independent code.

With the present invention, a hash value of unauthenticated code is embedded in associated automatically authenticated code. When the automatically authenticated code is downloaded and executed, the automatically authenticated code may require that the unauthenticated code also be downloaded for proper execution of the automatically authenticated code on a particular client device. The unauthenticated code can be downloaded and its integrity verified by generating a hash value of the unauthenticated code and comparing the generated hash value to a hash value embedded in the automatically authenticated code. Since the hash value of the unauthenticated code is embedded in authenticated code, and the authenticated code must have passed its authentication check or it would not have been executed, the embedded hash value can be trusted not to have been changed and can safely be used to determine whether the unauthenticated code has changed.

If there is a match, the unauthenticated code is verified. If there is not a match, the unauthenticated code has been corrupted during transmission and is not verified. As a result, the unauthenticated code is not used by the client device. The download of the unauthenticated code can then be attempted again and the verification process repeated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
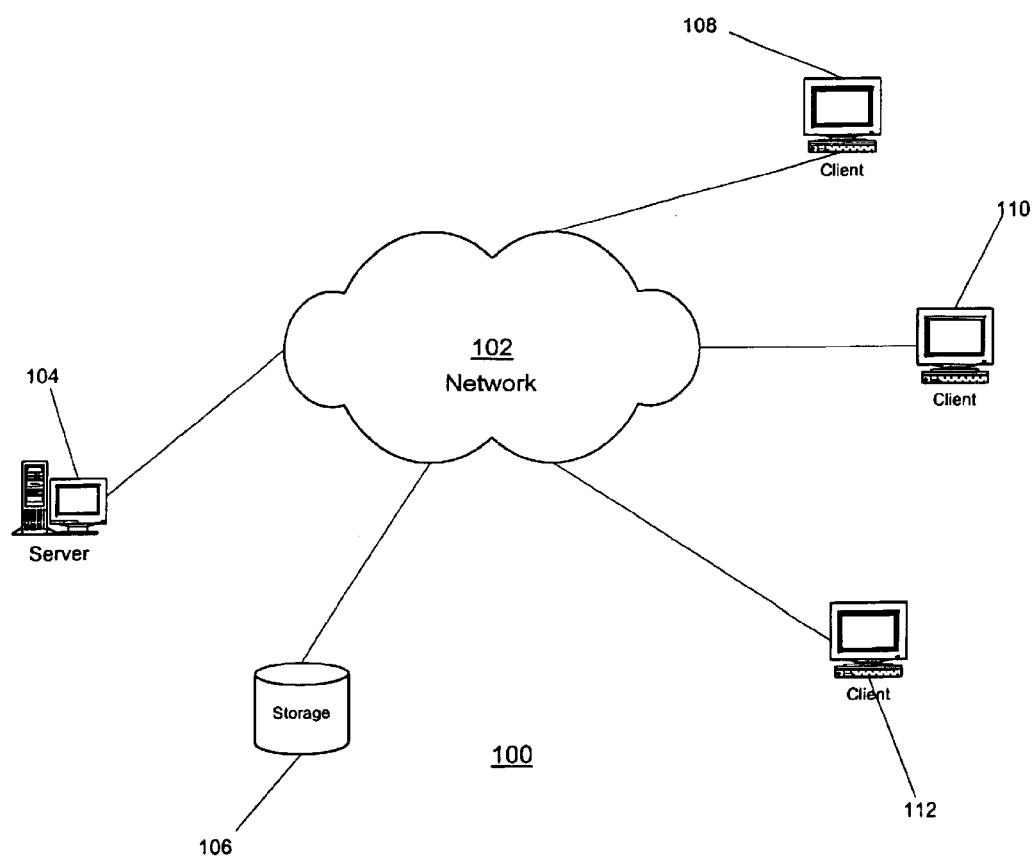
FIG. 1 is an exemplary block diagram of a distributed data processing system according to the present invention.

With reference now to the figures, and in particular with reference to FIG. 1, a pictorial representation of a distributed data processing system in which the present invention may be implemented is depicted. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention. The present invention may be implemented in the depicted distributed data processing system or modifications thereof as will be readily apparent to those of ordinary skill in the art.

The present invention provides a mechanism for establishing data flow from a trusted server, such as server 104, to a client device, such as client 110, over a non-secure link and still be able to make sure the data has not been changed during transmission. The present invention is applicable to any type of automatically authenticated and unauthenticated code that may be transmitted, for example, over the network 102.

The term "automatically authenticated code" as it is used in the present disclosure is meant to refer to code that is automatically authenticated through an existing mechanism, such as a virtual machine or the like, of a client device. The "automatically authenticated code" is automatically authenticated when received by the client device. An example of "automatically authenticated code" is compiled JAVA code that is automatically authenticated by the JAVA Virtual Machine (JVM) when received at the client device.

The term "unauthenticated code" as it is used in the present disclosure is meant to refer to code that is not automatically authenticated by existing mechanisms when received by the client device. An example of "unauthenticated code" is native code that may be downloaded to a client device when necessary for proper execution of compiled JAVA code. The present invention provides a mechanism by which this "unauthenticated code" can be authenticated when downloaded for use with associated automatically authenticated code.

In the preferred embodiments of the present invention, as described hereafter, the "automatically authenticated code" will be assumed to be compiled JAVA code and the "unauthenticate code" will be assumed to be native code, for purposes of illustration of the features of the present invention. However, one of ordinary skill in the art should appreciate that the present invention is equally applicable to any type of automatically authenticated and unauthenticated code.

Figure 2A:
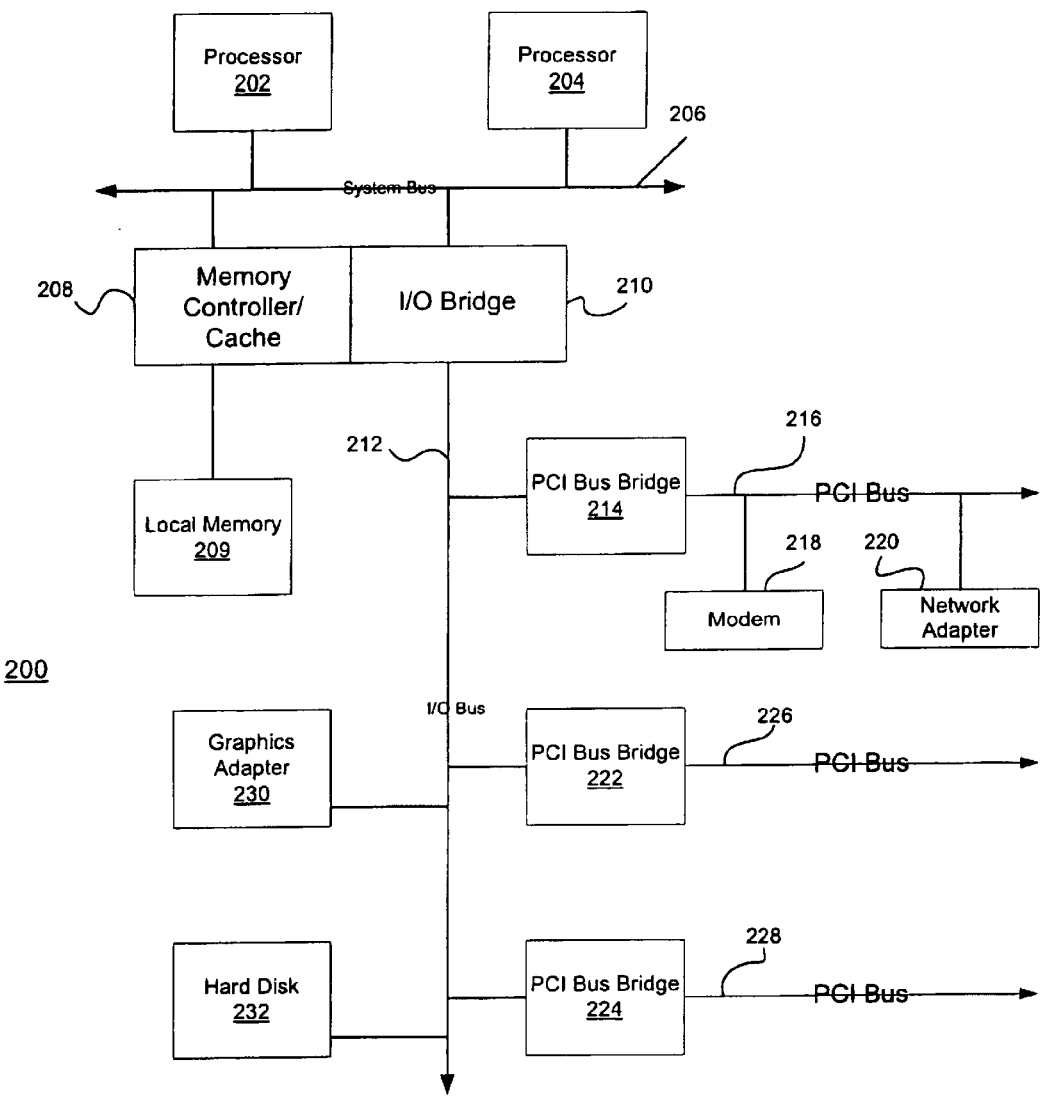
FIG. 2A is an exemplary block diagram of a data processing system according to the present invention.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

Figure 2B:
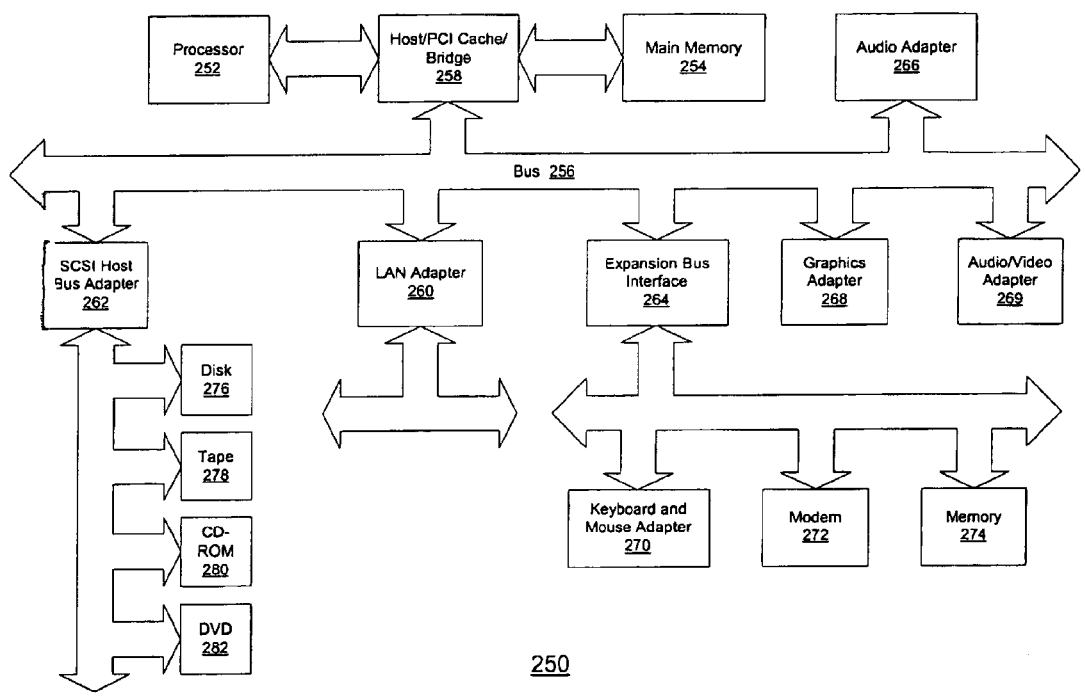
FIG. 2B is an exemplary block diagram of a data processing system according to the present invention.

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards.

In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 256 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, CD-ROM 280, and DVD 282 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as JAVA OS or OS/2, which are available from International Business Machines Corporation. JAVA OS is loaded from a server on a network to a network client and supports JAVA programs and applets. An object oriented programming system, such as JAVA, may run in conjunction with the operating system and may provide calls to the operating system from JAVA programs or applications executing on data processing system 250. Instructions for the operating system, the object-oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides an apparatus and method for ensuring the data integrity of unauthenticated code downloaded to a client device over a network. Although the present invention may operate on a variety of computer platforms and operating systems, it may also operate within a JAVA runtime environment. Hence, the present invention may operate in conjunction with a JAVA Virtual Machine (JVM) yet within the boundaries of a JVM as defined by JAVA standard specifications. In order to provide a context for the present invention, portions of the operation of a JVM according to JAVA specifications are herein described.

Figure 3A:
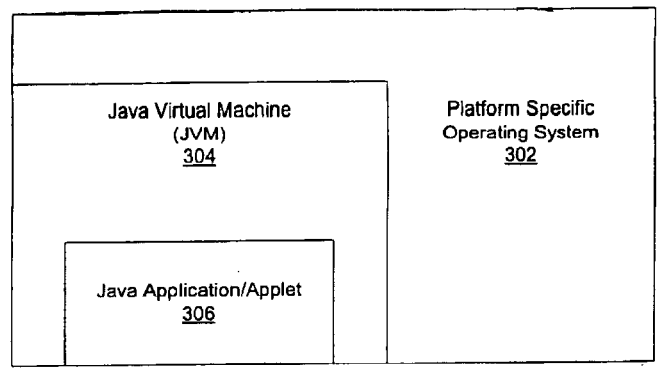
FIG. 3A is a block diagram illustrates the relationship of software components operating within a computer system that may implement the present invention.

With reference now to FIG. 3A, a block diagram illustrates the relationship of software components operating within a computer system that may implement the present invention. JAVA-based system 300 contains platform specific operating system 302 that provides hardware and system support to software executing on a specific hardware platform. JVM 304 is one software application that may execute in conjunction with the operating system. JVM 304 provides a JAVA run-time environment with the ability to execute JAVA application or applet 306, which is a program, servlet, or software component written in the JAVA programming language. The computer system in which JVM 304 operates may be similar to data processing system 200 or computer 250 described above. However, JVM 304 may be implemented in dedicated hardware on a so-called JAVA chip, JAVA-on-silicon, or JAVA processor with an embedded picoJAVA core.

At the center of a JAVA run-time environment is the JVM, which supports all aspects of JAVA's environment, including its architecture, security features, mobility across networks, and platform independence. The JVM is a virtual computer, i.e. a computer that is specified abstractly. The specification defines certain features that every JVM must implement, with some range of design choices that may depend upon the platform on which the JVM is designed to execute. For example, all JVMs must execute JAVA bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes JAVA programs. JAVA programs are not run directly by the central processor but instead by the JVM, which is itself a piece of software running on the processor. The JVM allows JAVA programs to be executed on a different platform as opposed to only the one platform for which the code was compiled. JAVA programs are compiled for the JVM. In this manner, JAVA is able to support applications for many types of data processing systems, which may contain a variety of central processing units and operating systems architectures. To enable a JAVA application to execute on different types of data processing systems, a compiler typically generates an architecture-neutral file format—the compiled code is executable on many processors, given the presence of the JAVA run-time system.

The JAVA compiler generates bytecode instructions that are nonspecific to a particular computer architecture. A bytecode is a machine independent code generated by the JAVA compiler and executed by a JAVA interpreter. A JAVA interpreter is part of the JVM that alternately decodes and interprets a bytecode or bytecodes. These bytecode instructions are designed to be easy to interpret on any computer and easily translated on the fly into native machine code.

A JVM must load class files and execute the bytecodes within them. The JVM contains a class loader, which loads class files from an application and the class files from the JAVA application programming interfaces (APIs) which are needed by the application. The execution engine that executes the bytecodes may vary across platforms and implementations.

One type of software-based execution engine is a just-in-time (JIT) compiler. With this type of execution, the bytecodes of a method are compiled to native machine code upon successful fulfillment of some type of criteria for "jitting" a method. The native machine code for the method is then cached and reused upon the next invocation of the method. The execution engine may also be implemented in hardware and embedded on a chip so that the JAVA bytecodes are executed natively. JVMs usually interpret bytecodes, but JVMs may also use other techniques, such as just-in-time compiling, to execute bytecodes.

When an application is executed on a JVM that is implemented in software on a platform-specific operating system, a JAVA application may interact with the host operating system by invoking native method, i.e. native code. A JAVA method is written in the JAVA language, compiled to bytecodes, and stored in class files. A native method is written in some other language and compiled to the native machine code of a particular processor. Native methods are stored in a dynamically linked library whose exact form is platform specific.

Figure 3B:
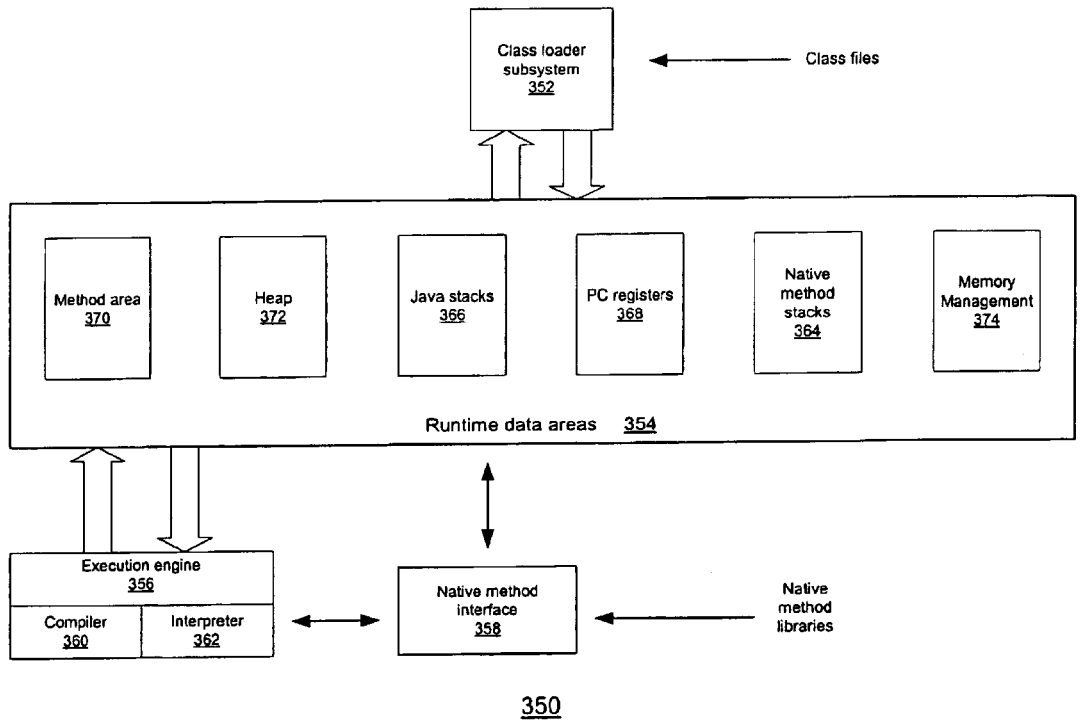
FIG. 3B is an exemplary block diagram of a JAVA Virtual Machine (JVM) according to the present invention.

With reference now to FIG. 3B, a block diagram of a JVM is depicted in accordance with a preferred embodiment of the present invention. JVM 350 includes a class loader subsystem 352, which is a mechanism for loading types, such as classes and interfaces, given fully qualified names. JVM 350 also contains runtime data areas 354, execution engine 356, native method interface 358, and memory management 374. Execution engine 356 is a mechanism for executing instructions contained in the methods of classes loaded by class loader subsystem 352. Execution engine 356 may be, for example, JAVA interpreter 362 or just-in-time compiler 360. Native method interface 358 allows access to resources in the underlying operating system. Native method interface 358 may be, for example, a JAVA native interface.

Runtime data areas 354 contain native method stacks 364, JAVA stacks 366, PC registers 368, method area 370, and heap 372. These different data areas represent the organization of memory needed by JVM 350 to execute a program.

JAVA stacks 366 are used to store the state of JAVA method invocations. When a new thread is launched, the JVM creates a new JAVA stack for the thread. The JVM performs only two operations directly on JAVA stacks: it pushes and pops frames. A thread's JAVA stack stores the state of JAVA method invocations for the thread. The state of a JAVA method invocation includes its local variables, the parameters with which it was invoked, its return value, if any, and intermediate calculations. JAVA stacks are composed of stack frames. A stack frame contains the state of a single JAVA method invocation. When a thread invokes a method, the JVM pushes a new frame onto the JAVA stack of the thread. When the method completes, the JVM pops the frame for that method and discards it.

The JVM does not have any registers for holding intermediate values; any JAVA instruction that requires or produces an intermediate value uses the stack for holding the intermediate values. In this manner, the JAVA instruction set is well-defined for a variety of platform architectures.

PC registers 368 are used to indicate the next instruction to be executed. Each instantiated thread gets its own pc register (program counter) and JAVA stack. If the thread is executing a JVM method, the value of the pc register indicates the next instruction to execute. If the thread is executing a native method, then the contents of the pc register are undefined.

Native method stacks 364 store the state of invocations of native methods. The state of native method invocations is stored in an implementation-dependent way in native method stacks, registers, or other implementation-dependent memory areas. In some JVM implementations, native method stacks 364 and JAVA stacks 366 are combined.

Method area 370 contains class data while heap 372 contains all instantiated objects. The JVM specification strictly defines data types and operations. Most JVMs choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 372. JVM 350 includes an instruction that allocates memory space within the memory for heap 372 but includes no instruction for freeing that space within the memory.

Memory management 374 in the depicted example manages memory space within the memory allocated to heap 370. Memory management 374 may include a garbage collector which automatically reclaims memory used by objects that are no longer referenced. Additionally, a garbage collector also may move objects to reduce heap fragmentation.

While the present invention is applicable to any system in which automatically authenticated and unauthenticated code are transmitted from a server device to a client device, the preferred embodiments of the present invention will be described in terms of a JAVA execution environment. Thus, the embodiments of the present invention will be explained in terms of signed JAVA code, unauthenticated native code, JAVA Virtual Machines, and the like. It should be appreciated by those of ordinary skill in the art that the present invention is equally applicable to other similar execution environments.

As mentioned above, when a client device requests an application from a trusted web server, such as a JAVA applet or application, the application is downloaded to the client device as compiled JAVA code. The compiled JAVA code includes an electronic signature which is used to verify the integrity of the application data received by the client device.

This electronic signature may be generated in any number of ways including, for example, using a one-way hash function. Using a one-way hash function on the application data, a small digest is computed which is then encrypted into a digital signature using a private key of the application's author. The signature and the application data are later transmitted to any client by any server. Upon receipt, the JVM of the client device, for example, can use the application author's public key (available from any trusted directory) to decrypt the signature back into the digest and then re-compute a new digest from the application data using the same method employed by the author. If the digests match, two facts have been established: (1) the code has not changed since the author sent it, because any change would result in a different hash value, and (2) the code was sent by the author, because only the author has access to the private key which can encrypt the hash value such that it can be correctly decrypted by the public key available to the client.

When the application is run on the client device, the application may require additional data files to be downloaded for execution on the particular client device. For example, if the application is a JAVA applet or application, the JAVA applet may need native methods, e.g., dynamically linked library (.dll) files, so that the JAVA applet can be properly executed on the client device.

In the known systems, the .dll files are downloaded as unauthenticated native code. Thus, there is no guarantee that the native code that is received by the client device is the same native code that was sent by the server. In other words, the native code may have been corrupted during transmission, either intentionally or unintentionally, and there is no mechanism by which to determine if the native code has been corrupted. This may cause a breach in the security of the client device.

Figure 4:
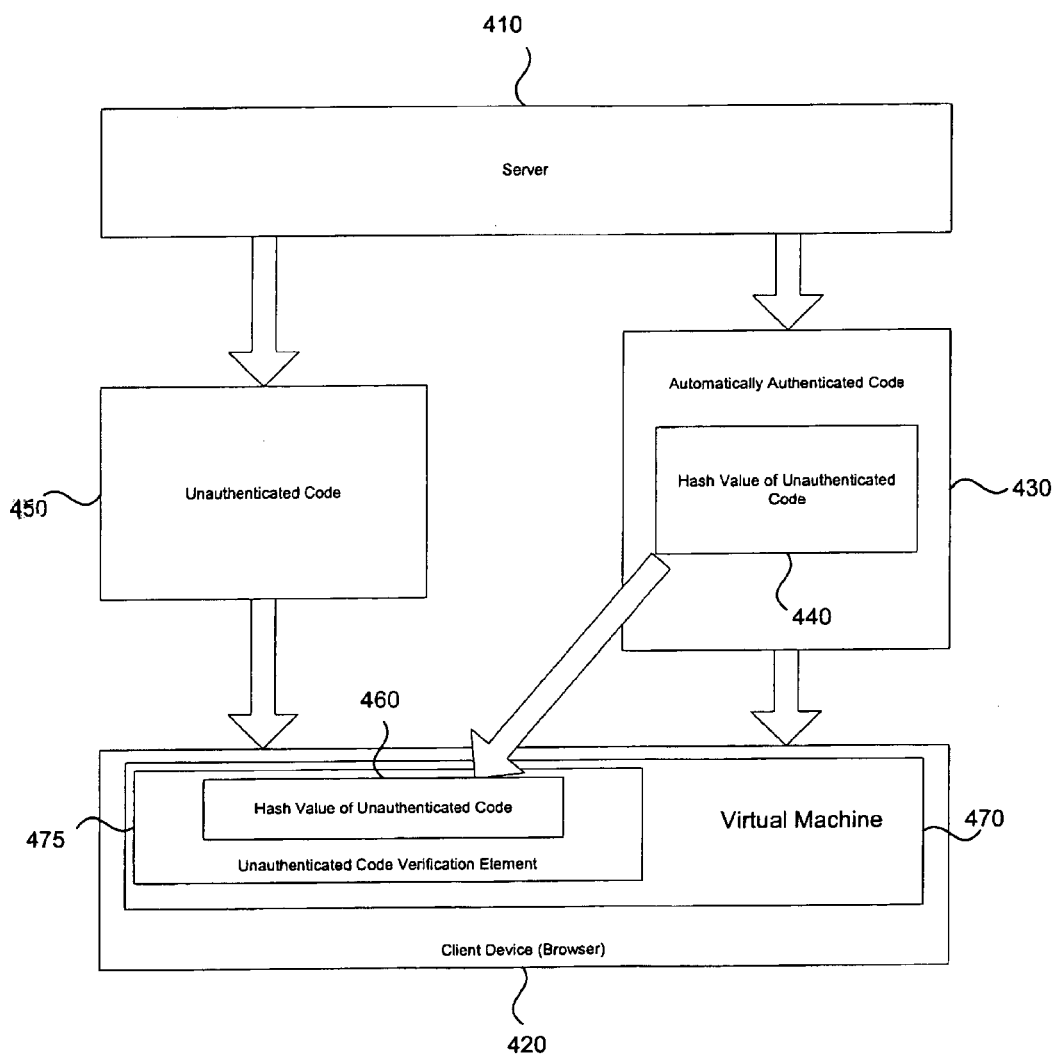
FIG. 4 is a block diagram illustrating the process of downloading and authenticating the data integrity of both signed and unsigned code.

FIG. 4 is an exemplary diagram illustrating the process of downloading and authenticating the data integrity of both automatically authenticated and unauthenticated code in accordance with the present invention. As shown in FIG. 4, with the present invention a hash value 440 of the unauthenticated code is generated. This signature value may be generated using, for example, Message Digest 5(MD5), Secure Hash Algorithm (SHA) or other similar methods. This hash value may be generated at the time the unauthenticated code is compiled, for example. For purposes of the following explanation, it will be assumed that the hash value is obtained using a hashing function.

The hash value 440 is then embedded in the automatically authenticated code 430 prior to the signature for the signed code being generated. In addition, an indicator of the type of hashing function used to generate the hash value may also be embedded in the signed code 430. This may be done, for example, by inserting a statement in the code that the hash value for the unauthenticated code, e.g. the .dll file, is a certain value and by inserting a hashing function identifier.

When the automatically authenticated code 430 is downloaded from a server 410 to the client device 420, verified and then executed, the virtual machine (VM) 470 associated with the web browser software on the client device 420 will request that the unauthenticated code 450 also be downloaded in order for the automatically authenticated code 430 to be properly executed. The determination of which unauthenticated code 450 is to be downloaded is performed in a known manner by the VM 470. The unauthenticated code must be known at the time the automatically authenticated code is compiled.

When the unauthenticated code 450 is downloaded, an unauthenticated code verification element 475 in the VM 470 of the client device 420 generates a hash value 460 of the unauthenticated code using the same hashing function used to generate the hash value 440 embedded in the automatically authenticated code 430. The hashing function to be used may be determined, for example, based on the hashing function identifier embedded in the automatically authenticated code 430.

The two hash values 440 and 460 are then compared by the unauthenticated code verification element 475. If the comparison results in a match, the unauthenticated code 450 is verified as being the same code sent by the server 410. If there is not a match, the unauthenticated code 450 has been corrupted during transmission. The unauthenticated code 450 is therefore, discarded and is not used during execution of the automatically authenticated code 430.

Because the corruption of the unauthenticated code 450 may have resulted from unintentional factors, such as packet loss or the like, the attempt to download the unauthenticated code 450 may be attempted a second time and the verification technique, described above, again applied. If the result of the second application of the above verification technique is that the unauthenticated code 450 is again corrupted, an error message may be returned by the VM 470 to the client device 420. The number of repeated attempts may be arbitrarily predetermined based on the desires of the network administrator, the operator of the client device, or the like.

In addition, the present invention is able to discern whether or not corruption of the unauthenticated code 450 is due to intentional or unintentional factors. If the unauthenticated code 450 is corrupt and the attempt to download the unauthenticated code 450 a second time results in the unauthenticated code 450 being corrupted again, the hash values generated during the first and second attempts may be compared. If the hash values match, then the corruption is most likely the result of intentional factors. That is, the corruption is identical each time. This will likely occur if a "hacker" is accessing the transmitted unauthenticated code and altering it in some way.

If the hash values do not match, then the corruption is most likely the result of unintentional means. This will likely occur if random factors, such as packet loss and the like, affect the transmission.

Figure 5:
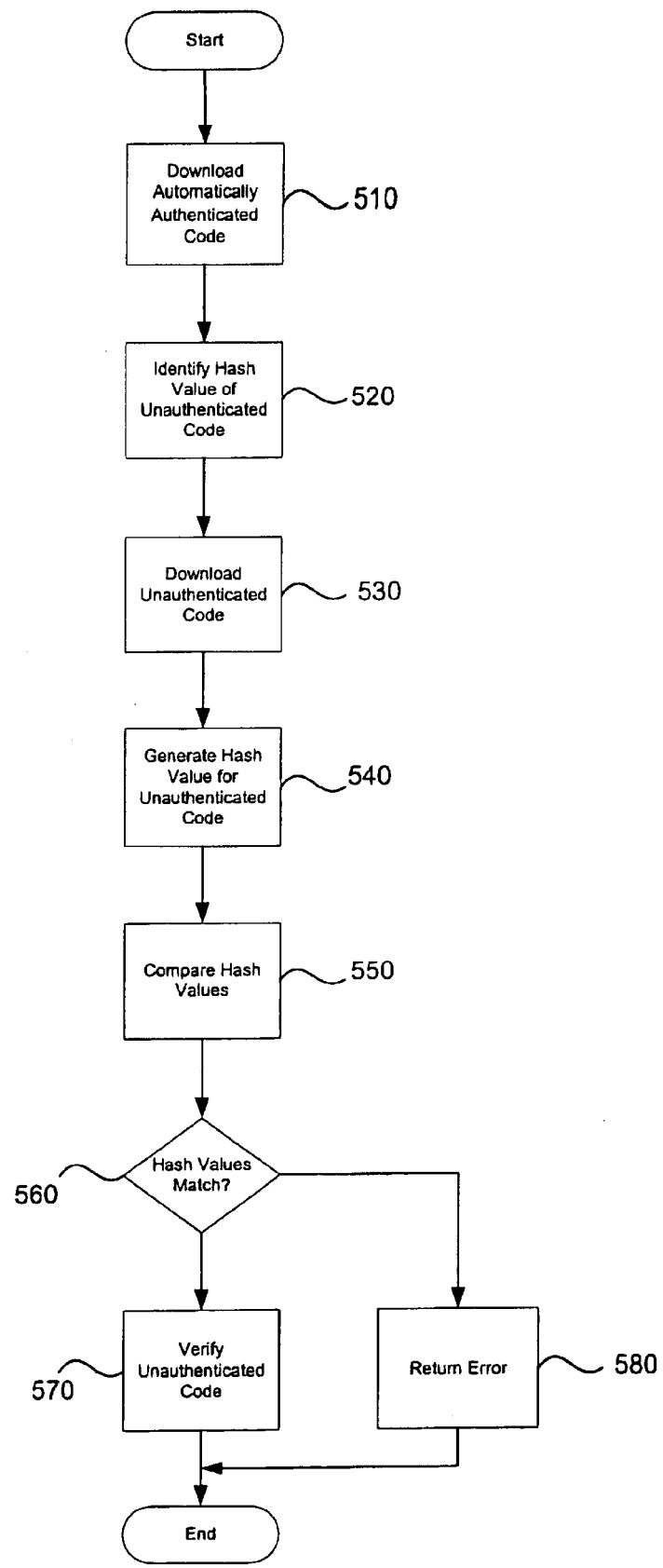
FIG. 5 is flowchart outlining an exemplary operation of the present invention.

FIG. 5 is a flowchart outlining an exemplary operation of the present invention. As shown in FIG. 5, the operation starts with downloading the automatically authenticated code from the server (step 510). The hash value of the unauthenticated code is identified in the automatically authenticated code (step 520).

The unauthenticated code is downloaded from the server (step 530). A hash value for the unauthenticated code is generated (step 540) and compared with the hash value embedded in the automatically authenticated code (step 550). A determination is made as to whether the hash values match (step 560).

If the hash values match, the unauthenticated. code is verified and may be used by the client device (step 570). If the hash values do not match, an error is returned (step 580). The operation then ends.

It should be noted, however, that steps 530–580 may be repeated a predetermined number of times in order to take into consideration the possibility of unintentional corruption of the unauthenticated code. Furthermore, as mentioned above, the operation may optionally include the ability to compare a previously generated hash value to a currently generated hash value in order to determine if the corruption is intentional or unintentional.

Thus, with the present invention, data flow from a trusted server to a client device can be accomplished over a non-secure link while still maintaining security by verifying the integrity of transmitted data. The present invention protects the client device from executing unauthenticated code that has been corrupted by a third party. Specifically, the present invention protects the client device from unauthenticated code that has been tampered with by a hacker during transmission from the server to the client device.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of verifying the integrity of unauthenticated code, comprising:

receiving automatically authenticated code, the automatically authenticated code including an embedded first hash value of the unauthenticated code;

receiving the unauthenticated code;

generating a second hash value of the unauthenticated code;

comparing the first hash value and the second hash value; and verifying the integrity of the unauthenticated code if the first hash value and the second hash value match.

2. The method of claim 1, wherein the automatically authenticated code is compiled platform independent code and wherein the unauthenticated code is native code.

3. The method of claim 1, wherein the automatically authenticated code is a platform independent application or applet and wherein the unauthenticated code is a dynamically linked library.

4. The method of claim 1, wherein the first hash value is obtained using a hashing function and wherein generating a second hash value of the unauthenticated code includes using the same hashing function as was used to obtain the first hash value.

5. The method of claim 4, wherein the hashing function is identified based on information stored in the automatically authenticated code.

6. The method of claim 1, further comprising:

executing the automatically authenticated code using a virtual machine; and sending a request to a server from which the automatically authenticated code was received, the request being for the unauthenticated code.

7. The method of claim 1, wherein, if the first hash value and the second hash value do not match, the method further comprises:

receiving the unauthenticated code again;

generating a third hash value of the unauthenticated code; and comparing the first hash value and the third hash value.

8. The method of claim 7, wherein if the third hash value and the first hash value do not match, the method further comprises:

comparing the second hash value and the third hash value; and if the second hash value and the third hash value match, determining that the unauthenticated code has been corrupted intentionally.

9. The method of claim 8, wherein if the second hash value and the third hash value do not match, it is determined that the unauthenticated code has been corrupted unintentionally.

10. The method of claim 1, wherein the method is implemented in a virtual machine associated with a web browser on a client device.

11. An apparatus for verifying the integrity of unauthenticated code, comprising:

a virtual machine; and an unauthenticated code verification element, wherein the virtual machine receives automatically authenticated code, the automatically authenticated code including an embedded first hash value of the unauthenticated code, and receives the unauthenticated code, and wherein the unauthenticated code verification element generates a second hash value of the unauthenticated code, compares the first hash value and the second hash value, and verifies the integrity of the unauthenticated code if the first hash value and the second hash value match.

12. The apparatus of claim 11, wherein the automatically authenticated code is compiled platform independent code and wherein the unauthenticated code is native code.

13. The apparatus of claim 11, wherein the automatically authenticated code is a platform independent application or applet and wherein the unauthenticated code is a dynamically linked library.

14. The apparatus of claim 11, wherein the first hash value is obtained using a hashing function and wherein the unauthenticated code verification element generates a second hash value of the unauthenticated code using the same hashing function as was used to obtain the first hash value.

15. The apparatus of claim 14, wherein the hashing function is identified by the unauthenticated code verification element based on information stored in the automatically authenticated code.

16. The apparatus of claim 11, wherein the virtual machine executes the automatically authenticated code and sends a request to a server from which the automatically authenticated code was received, the request being for the unauthenticated code.

17. The apparatus of claim 11, wherein, if the first hash value and the second hash value do not match, the virtual machine receives the unauthenticated code again, the unauthenticated code verification element generates a third hash value of the unauthenticated code and compares the first hash value and the third hash value.

18. The apparatus of claim 17, wherein if the third hash value and the first hash value do not match, the unauthenticated code verification element compares the second hash value and the third hash value and, if the second hash value and the third hash value match, determines that the unauthenticated code has been corrupted intentionally.

19. The apparatus of claim 18, wherein if the second hash value and the third hash value do not match, the unauthenticated code verification element determines that the unauthenticated code has been corrupted unintentionally.

20. The apparatus of claim 11, wherein the virtual machine and the unauthenticated code verification element are associated with a web browser on a client device.

21. A computer program product in a computer readable medium for verifying the integrity of unauthenticated code, comprising:

first instructions for receiving automatically authenticated code, the automatically authenticated code including an embedded first hash value of the unauthenticated code;

second instructions for receiving the unauthenticated code;

third instructions for generating a second hash value of the unauthenticated code;

fourth instructions for comparing the first hash value and the second hash value; and fifth instructions for verifying the integrity of the unauthenticated code if the first hash value and the second hash value match.

22. The computer program product of claim 21, wherein the automatically authenticated code is compiled platform independent code and wherein the unauthenticated code is native code.

23. The computer program product of claim 21, wherein the automatically authenticated code is a platform independent application or applet and wherein the unauthenticated code is a dynamically linked library.

24. The computer program product of claim 21, wherein the first hash value is obtained using a hashing function and wherein the third instructions for generating a second hash value of the unauthenticated code include instructions for using the same hashing function as was used to obtain the first hash value.

25. The computer program product of claim 24, further comprising instructions for identifying the hashing function based on information stored in the automatically authenticated code.

26. The computer program product of claim 21, further comprising:

sixth instructions for executing the automatically authenticated code using a virtual machine; and seventh instructions for sending a request to a server from which the automatically authenticated code was received, the request being for the unauthenticated code.

27. The computer program product of claim 21, further comprising:

sixth instructions for receiving the unauthenticated code again, if the first hash value and the second hash value do not match;

seventh instructions for generating a third hash value of the unauthenticated code; and eighth instructions for comparing the first hash value and the third hash value.

28. The computer program product of claim 27, further comprising:

ninth instructions for comparing the second hash value and the third hash value, if the third hash value and the first hash value do not match; and tenth instructions for determining that the unauthenticated code has been corrupted intentionally if the second hash value and the third hash value match.

29. The computer program product of claim 28, further comprising eleventh instructions for determining that the unauthenticated code has been corrupted unintentionally, if the hash value and the third hash value do not match.

* * * * *

UNITED STATES PATENT AND TRADEMARK OFFICE
CERTIFICATE OF CORRECTION

PATENT NO. : 6,922,782 B1
DATED : July 26, 2005
INVENTOR(S) : Spyker et al.

It is certified that error appears in the above-identified patent and that said Letters Patent is hereby corrected as shown below:

Column 1,
Line 25, after "from" delete "Sun" and insert -- Sun Microsystems, Inc. --.

Column 14,
Line 14, before the first occurrence of "hash value" insert -- second --.

Signed and Sealed this

Fourteenth Day of March, 2006

JON W. DUDAS
*Director of the United States Patent and Trademark Office*